No. 893,334. PATENTED JULY 14, 1908.
R. J. LINDSAY.
BRAKE HANGER.
APPLICATION FILED JAN. 28, 1907.

WITNESSES:
P. E. Maynard

INVENTOR
Richard J. Lindsay,
BY Geo. H. Strong
ATTORNEY

UNITED STATES PATENT OFFICE.

RICHARD J. LINDSAY, OF WRIGHTS, CALIFORNIA.

BRAKE-HANGER.

No. 893,334.     Specification of Letters Patent.     Patented July 14, 1908.

Application filed January 28, 1907. Serial No. 354,432.

*To all whom it may concern:*

Be it known that I, RICHARD J. LINDSAY, a citizen of the United States, residing at Wrights, in the county of Santa Clara and State of California, have invented new and useful Improvements in Brake-Hangers, of which the following is a specification.

My invention relates to an equalizing attachment and hanger for vehicles, and it is especially adapted for use upon wagons having springs, and where the height of the wagon-bed above the axle, varies considerably by reason of the difference in load.

It consists in a combination of parts, and in a detail of construction which will be more fully explained by reference to the accompanying drawings, in which—

Figure 1:
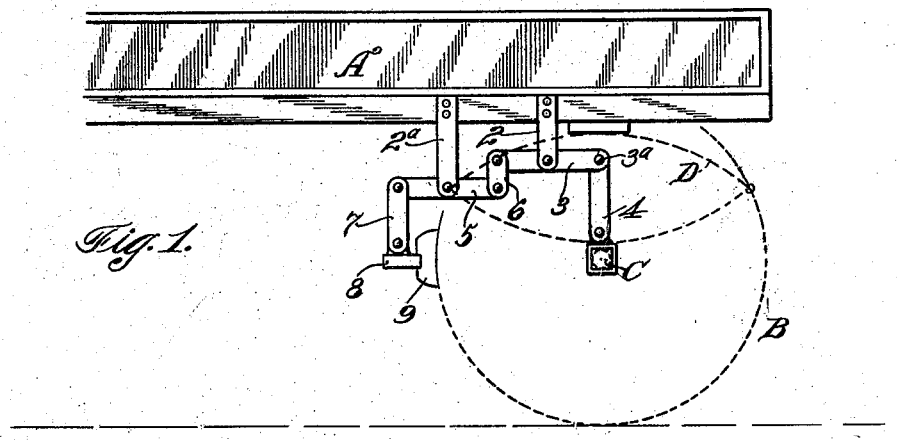
Figure 2:
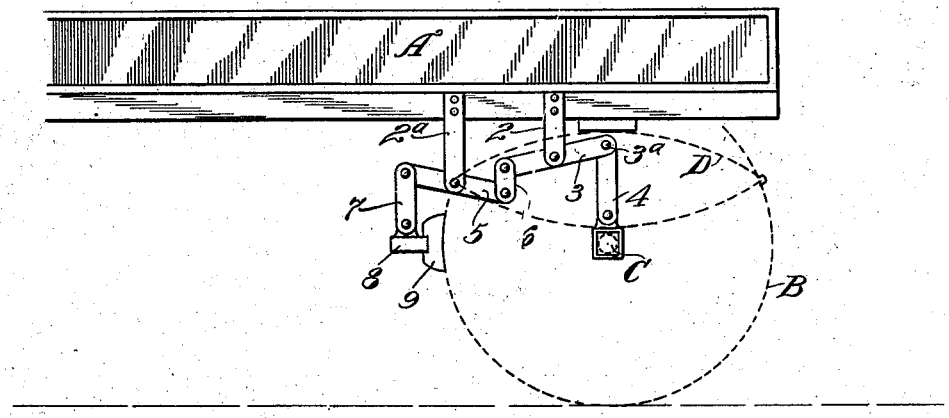

Figure 1 is a view showing the rear end of an unloaded vehicle with my attachment. Fig. 2 shows the same with a partial load.

In many spring wagons for conveying goods and especially those used in transporting fresh fruit, the springs are made of very considerable depth, so that when the wagon is loaded there will still be a considerable opening of the springs to prevent the shock of the body striking the axle in passing over rough places in the roads, such shocks being very detrimental to the fruit, and where fruit must be shipped long distances it is imperatively necessary that it be sent away in the best possible condition. With vehicles having such springs it is very difficult to place the brakes in such position that they will always act to the best advantage; either the brake is too high when the springs are fully extended, or if placed right at that time, it is much too low when the vehicle is loaded and the effectiveness of the brake is greatly reduced.

It is the object of my invention to provide an equalizing device by which the brake shoes are maintained in the proper relation with the wheels, both when the vehicle is unloaded and loaded.

The wagon-body A is mounted upon wheels as at B having an axle C and springs D mounted upon an axle and supporting the wagon-body.

In my invention I have shown hangers 2 bolted or secured to the wagon sills and extending downwardly therefrom. To the rearmost of these hangers is pivoted a lever 3. One end of this lever is located substantially in line above the axle C, and is connected with the axle by a rigid bar 4. This bar serves practically as a fulcrum for the lever 3, and when the wagon body is raised or depressed the bar 2 will move the lever 3 about the fulcrum point which is practically stationary with relation to the ground by reason of the support of the wheels.

5 is a lever similar to 3 and approximately centrally pivoted upon the forward bar $2^a$, which is slightly longer than the rearmost bar 2, so that the rear end of this lever 5 is substantially beneath the front end of the lever 3 and these two ends are connected by a link 6 to which they are pivoted.

The forward end of the lever 5 has link connections 7 from which the brake beam 8 and the brake shoes 9 are supported.

The brake beam and shoes may be moved to and from the wheels B by any suitable or well known mechanism not here shown.

The operation of my device will then be as follows: The brake shoes 9 are normally supported when the wagon is empty at substantially the height of the axle, so that they may be pressed directly against the peripheries of the wheel rims at this height. When the load is placed upon the wagon, the springs will be closed, and through the connections 2 the lever 3 will be depressed, because its rear end is rigidly supported by the arm or link 4 resting upon the axle. This depression of the lever 3 moves it about its fulcrum point $3^a$ and thus depresses the forward end below the point where it is pivoted to the hanging bar 2. This acting through the link 6 depresses the rear end of the bar 5; the central portion of this bar being fulcrumed upon the hanger $2^a$, and the downward movement of the contiguous ends of the levers 3 and 5 is greater than the movement of the hangers $2$—$2^a$, which are moved equally by the depression of the wagon body. This action serves to raise the front end of the bar 5 and with it the hangers 7, the brake beam 8 and brake shoes 9, thus maintaining the brake shoes at all times substantially in the same position relative to the wheels B.

By this construction I provide an automatic equalizing device which will always maintain the brake shoes at the point where they are most effective whether the wagon be unloaded or loaded to its capacity.

Having thus described my invention, what I claim and desire to secure by Letters Patent is—

1. In a vehicle, a body mounted upon springs, said springs resting upon the wheel axles, levers pivotally supported intermediate of their ends and connected with the vehicle body, the outer end of one of the levers being rigidly supported and fulcrumed with relation to the wheel axle, the outer end of the other lever sustaining the brake beam and the contiguous ends of the two levers being connected together.

2. A brake equalizing device for spring wagons, said device consisting of two substantially centrally pivoted levers suspended upon the vehicle body having their contiguous ends flexibly connected, a support from the wheel axle for the outer end of one of the levers, and connections between the outer end of the other lever and the brake hanger.

3. In a spring vehicle brake hanger, levers pivotally connected with the vehicle body to move up and down in unison with the movements of the springs, link connections between the contiguous ends of said levers, brakes suspended from the outer end of one of said levers, a supporting connection between the outer end of the other lever and the bearing-wheel axle.

4. In a wagon, the combination with the front and rear axles, of a bed, springs interposed between the bed and axles, a brake beam supported by the bed and depending therebelow, and means for retaining the brake beam in fixed vertical relation with respect to the axles.

In testimony whereof I have hereunto set my hand in presence of two subscribing witnesses.

RICHARD J. LINDSAY.

Witnesses:
S. H. NOURSE,
FREDERICK E. MAYNARD.